United States Patent
Belzile et al.

(10) Patent No.: US 11,186,023 B2
(45) Date of Patent: Nov. 30, 2021

(54) SHOOTING POT PLUNGER CONTROL

(71) Applicant: Husky Injection Molding Systems Ltd., Bolton (CA)

(72) Inventors: Manon Danielle Belzile, Fairfield, VT (US); Patrice Fabien Dezon-Gaillard, Jericho, VT (US); James Osborne Plumpton, Enosburg Falls, VT (US)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 128 days.

(21) Appl. No.: 15/775,399

(22) PCT Filed: Nov. 4, 2016

(86) PCT No.: PCT/US2016/060506
§ 371 (c)(1),
(2) Date: May 11, 2018

(87) PCT Pub. No.: WO2017/083190
PCT Pub. Date: May 18, 2017

(65) Prior Publication Data
US 2018/0345558 A1 Dec. 6, 2018

Related U.S. Application Data

(60) Provisional application No. 62/253,863, filed on Nov. 11, 2015.

(51) Int. Cl.
*B29C 45/80* (2006.01)
*B29C 45/76* (2006.01)
(Continued)

(52) U.S. Cl.
CPC ............ *B29C 45/80* (2013.01); *B29C 45/076* (2013.01); *B29C 45/53* (2013.01); *B29C 45/762* (2013.01); *B29C 45/768* (2013.01); *B29C 45/021* (2013.01); *B29C 45/77* (2013.01); *B29C 45/78* (2013.01); *B29C 2945/7604* (2013.01); *B29C 2945/76006* (2013.01); *B29C 2945/76287* (2013.01); *B29C 2945/76568* (2013.01);
(Continued)

(58) Field of Classification Search
None
See application file for complete search history.

(56) References Cited

U.S. PATENT DOCUMENTS 4,734,243 A * 3/1988 Kohama ................. B29C 45/12
264/328.14
4,851,170 A 7/1989 Shimizu et al.
(Continued)

OTHER PUBLICATIONS

International Search Report, 3 pages.

*Primary Examiner* — Benjamin A Schiffman

(57) ABSTRACT

Disclosed is a method of adjusting a motion profile of a shooting pot plunger for use in a molding system, the shooting pot plunger slidably movable within a shooting pot cavity, the method comprising: sensing a characteristic at a predetermined location in an injection circuit of the molding system; determining that the sensed characteristic is outside of a threshold range; adjusting the motion profile of the shooting pot plunger to account for determining that the sensed characteristic is outside of the threshold range; and storing the adjusted motion profile in a memory.

4 Claims, 5 Drawing Sheets

(51) Int. Cl.
    *B29C 45/07*     (2006.01)
    *B29C 45/53*     (2006.01)
    *B29C 45/77*     (2006.01)
    *B29C 45/02*     (2006.01)
    *B29C 45/78*     (2006.01)

(52) U.S. Cl.
    CPC ........... *B29C 2945/76575* (2013.01); *B29C 2945/76581* (2013.01); *B29C 2945/76595* (2013.01); *B29C 2945/76678* (2013.01); *B29C 2945/76859* (2013.01); *B29C 2945/76936* (2013.01); *B29C 2945/76943* (2013.01)

(56) References Cited

U.S. PATENT DOCUMENTS

| | | | |
|---|---|---|---|
| 4,954,063 A | 9/1990 | Iwamoto | |
| 4,966,545 A * | 10/1990 | Brown | B29C 45/02 264/297.2 |
| 5,125,820 A | 7/1992 | Iwamoto | |
| 5,296,179 A | 3/1994 | Kamiguchi et al. | |
| 5,595,693 A | 7/1997 | Fujita et al. | |
| 5,733,486 A | 3/1998 | Hayasi et al. | |
| 5,858,420 A * | 1/1999 | Szajak | B29C 45/54 425/557 |
| 5,914,077 A | 6/1999 | Fujita | |
| 6,241,932 B1 * | 6/2001 | Choi | B29C 45/54 264/328.19 |
| 6,649,094 B1 * | 11/2003 | Galt | B29C 45/1753 264/328.19 |
| 7,029,268 B2 | 4/2006 | Doyle et al. | |
| 7,270,537 B2 | 9/2007 | Doyle et al. | |
| 7,597,828 B2 | 10/2009 | Doyle et al. | |
| 7,775,790 B2 | 8/2010 | Lindee et al. | |
| 8,011,914 B2 | 9/2011 | Taylor et al. | |
| 8,708,683 B2 * | 4/2014 | Belzile | B29C 45/02 425/130 |
| 9,180,613 B2 * | 11/2015 | Belzile | B29C 45/531 |
| 2004/0047935 A1 | 3/2004 | Moss et al. | |
| 2006/0082009 A1 | 4/2006 | Quail et al. | |
| 2009/0206501 A1 | 8/2009 | Van Eerde et al. | |
| 2012/0068373 A1 | 3/2012 | Craig et al. | |
| 2012/0179288 A1 | 7/2012 | Leung et al. | |
| 2018/0319058 A1 * | 11/2018 | Belzile | B29C 45/02 |
| 2018/0354178 A1 * | 12/2018 | Belzile | B29C 45/76 |

* cited by examiner

SHOOTING POT PLUNGER CONTROL

TECHNICAL FIELD

The present disclosure relates to injection molding machines and in particular to shooting pots.

BACKGROUND

Injection molding machines generally include a hopper for receiving resin, a barrel connected to the hopper and a screw that moves within the barrel to impart a force onto the resin to melt and move the resin along the barrel. The melted resin is injected from the barrel into a melt passage apparatus that defines one or more melt passage. The melted resin passes through the melt passage(s) to one or more nozzle. The melted resin is then expelled into a mold cavity through a gate. The mold cavity can be formed by clamping two mold plates together.

SUMMARY

In one aspect, disclosed is a method of adjusting a motion profile of a shooting pot plunger for use in a molding system, the shooting pot plunger slidably movable within a shooting pot cavity, the method comprising: sensing a characteristic at a predetermined location in an injection circuit of the molding system; determining that the sensed characteristic is outside of a threshold range; adjusting the motion profile of the shooting pot plunger to account for determining that the sensed characteristic is outside of the threshold range; and storing the adjusted motion profile in a memory.

In another aspect, disclosed is a shooting pot controller system for adjusting a motion profile of a shooting pot plunger for use in a molding system comprising: a controller for controlling the operation of the shooting pot plunger in a shooting pot cavity in accordance with the motion profile; a sensor for sensing a characteristic at a predetermined location in an injection circuit of the molding system, the sensor in communication with the shooting pot controller; and a database in communication with the shooting pot controller, the database for storing a mapping between sensed characteristics and motion profile adjustments.

Figure 1:
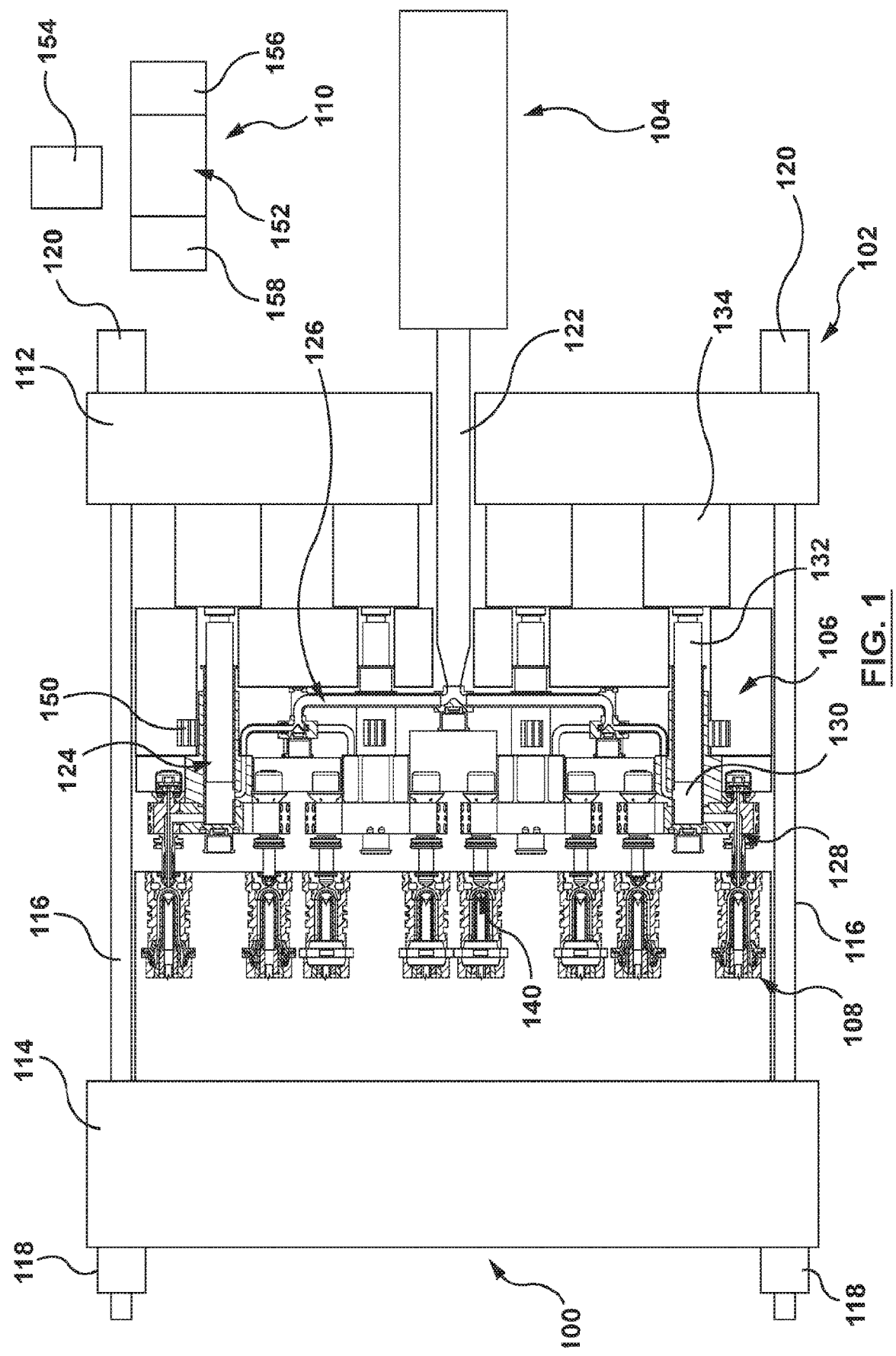
FIG. 1 is a cross sectional side view of a molding system.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference numerals are used in the drawings to identify like elements and features.

DETAILED DESCRIPTION

Disclosed generally is a method and system for adjusting the motion profile of a shooting pot plunger in a shooting pot cavity of a molding system such as an injection molding machine. Implementing this method or system can reduce the wear on components in the molding system, can increase the efficiency in filling or refilling the shooting pots and can increase the quality and consistency of the resulting molded parts.

Generally, each shooting pot plunger moves within a shooting pot cavity to expel melted resin from the respective shooting pot cavity. The shooting pot plunger operates in accordance with a motion profile. In other words, the movement of the shooting pot plunger during an injection cycle or during a refill cycle, or both, is controlled and follows a motion profile. The motion profile can dictate the position and speed of the shooting pot plunger within the shooting pot cavity at any point (approximately) during the cycle.

One or more pressure sensors are placed near or within a melt passage or near or within another location in which melted resin can be found. The sensed pressure is compared to a predetermined threshold range of pressures for the relevant time during the injection cycle and with respect to the location of the sensors in the molding system. If the sensed pressure falls outside of the threshold range of pressures then an adjustment is made to the motion profile of the shooting pot plunger to account for this pressure difference.

In another implementation of the invention, a temperature sensor, such as a thermocouple, is placed in a mold cavity. Or multiple thermocouples can be placed in multiple respective mold cavities. The thermocouple can be placed in the mold cavity in order to sense the flow front arrival. The sensed temperature is compared to a predetermined threshold range of temperatures for the relevant time during the injection cycle. If the sensed temperature falls outside of the threshold range of temperatures then an adjustment is made to the motion profile of the shooting pot plunger to account for this temperature difference.

The Molding System 100

FIG. 1 shows an example of a molding system 100. The molding system 100 includes a clamp assembly 102, an injection unit 104, a melt distribution assembly 106, a mold assembly 108 and a shooting pot controller 110. In the illustrated embodiments the molding system 100 is used for manufacturing preforms. In alternative embodiments, the molding system 100 can be adapted to manufacture other molded articles, such as thin wall containers for subsequent blow molding into final shaped containers, medical appliances, and closures.

The clamp assembly 102 includes a stationary platen 112, a movable platen 114, tie bars 116, a lock unit 118 and a clamp unit 120. Alternatively, the clamp assembly 102 can have three platens with a movable platen moving between two stationary platens.

The injection unit 104 in the FIG. 1 is shown in schematic. The injection unit 104 generally includes a hopper or other inlet, a barrel, a screw and a machine nozzle 122. The hopper or other inlet is an opening connected to the barrel and is used to receive resin. The resin passes through the hopper or other inlet into the barrel. The screw is housed in the barrel and can rotate and move linearly to melt and move the resin in the barrel. There may be alternative or additional ways of melting or moving the resin, such as using heaters on the barrel.

The machine nozzle 122 is connected to an end of the barrel. The machine nozzle 122 provides a passage from the melted resin to the melt distribution assembly 106. For example, the screw can inject the resin from the barrel through the machine nozzle 122 and into the melt distribution assembly 106. Different mechanisms for transferring resin to the melt distribution assembly 106 can be used, such as a machine shooting pot. The machine nozzle 122 can pass through a plate 105 proximate the fluid connection of the machine nozzle 122 and melt distribution assembly 106.

The melt distribution assembly 106 includes a manifold 126 defining refill passages 198 and injection passages 199, one or more shooting pots 124, and one or more nozzle assemblies 128. For ease of reference the manifold is not fully shown in FIG. 1.

The refill melt passages 198 extend from an outlet of the machine nozzle 122. The outlet of the machine nozzle 122 can fluidly connect to a bushing and the refill melt passage 198 can extend from the bushing, for example. The refill melt passage 198 branch from the outlet of the machine nozzle 122 or from the bushing and each fluidly connect to a shooting pot cavity 130. There may be multiple branches of the refill melt passage 198 between the machine nozzle 122 and the shooting pot cavity 130.

The shooting pots 124 each include a shooting pot cavity 130, a shooting pot plunger 132 and a shooting pot actuator 134. The refill melt passages 198 lead to an inlet to the shooting pot cavity 130. The refill melt passages 198 connecting the injection unit 104 to the shooting pot cavity 130 can also be called the refill circuit.

The shooting pot cavity 130 has an outlet, leading to a respective injection melt passage 199. Each shooting pot cavity 130 leads to a separate respective injection melt passage 199.

The mold assembly 108 includes a stationary mold portion and a movable mold portion that cooperate to define one or more mold cavities 140. The stationary mold portion is associated with the stationary platen 112. For example, the stationary mold portion can be connected to the stationary platen 112. The movable mold portion is associated with the movable platen 114. For example, when the movable platen 114 moves relative to the stationary platen 112 the movable mold portion similarly moves relative to the stationery mold portion. In FIG. 1, the mold assembly 108 is shown in simplified form.

Each injection melt passage 199 leads eventually to a respective mold cavity 140. For example the injection melt passage 199 first leads to a shooting pot cavity 130 and then to a nozzle assembly 128 and then to the respective mold cavity 140. Generally Resin flows from the injection unit 104, through the refill melt passage 198 and into the shooting pot cavity 130. The resin is then expelled from the shooting pot cavity into the injection melt passage 199, through the nozzle assembly 128 and then into the mold cavity 140. As such the injection melt passage 199 may be partially defined in the nozzle assembly 128 and in the manifold 126, for example. The phrase "injection melt passage 199" can include all branches of the injection melt passage 199 that lead to separate mold cavities 140.

The mold cavities 140 are each fluidly connected to a respective outlet of the injection melt passage 199 for receiving resin.

The shooting pot controller 110 includes a sensor 150, a controller 152 and a database 154. Another form of memory can be used instead of or in addition to a database 154. The database 154 can be remote from the shooting pot controller 110. The shooting pot controller 110 is generally shown in schematic in FIG. 1. The shooting pot controller 110 can also be called a shooting pot controller system.

The sensor 150 is used to measure a property or characteristic of the resin at a predetermined location of the molding system 100. There can be more than one sensor 150. For example, there can be one sensor 150 associated with each shooting pot 124. Or there can be sensors 150 that measure different properties or characteristics of the resin. Or there can be sensors 150 that measure properties of the resin at different (predetermined) locations in the molding system 100.

The sensor 150 can be a pressure sensor such as a bridge sensor, a pressure or force transducer or load cell. The sensor 150 can be a temperature sensor such as a thermocouple such as a J or K type thermocouple. The sensor 150 can be a camera that can be used to measure dimensions of a molded part for example.

The one or more sensor 150 can be located at various predetermined locations. For example, a pressure sensor can be located or disposed somewhere proximate the injection unit 104, the refill melt passage 198, or shooting pot 124 in order to measure the pressure of the resin in the refill circuit or shooting pot 124. Similarly, a pressure sensor can be located or disposed proximate to the injection unit 104 in order to measure the pressure on the resin in the injection unit 104, such as in the barrel or machine nozzle 122. In another example, a thermocouple can be disposed in a mold cavity in order to sense the front flow arrival.

The one or more sensor 150 can be located proximate the shooting pot cavity 130 in order to measure a property or characteristic of the resin within the shooting pot cavity 130. The one or more sensor 150 can be proximate to the mold cavity 140 in order to measure a property of the resin in the mold cavity 140, which can include measuring a property of a molded part that is formed in the mold cavity 140. Similarly, the one or more sensor 150 can be located proximate to the injection mold passage 199.

The controller 152 can include a computer or processor that can execute instructions stored on a memory. The memory can be considered part of the controller 152.

The controller 152 can communicate with the database 154 and the sensor 150. For example, the controller may communicate through a wireless or wired connection with the database 154 or sensor 150.

The controller 152 can be attached to a portion of the molding system 100. The controller 152 or shooting pot controller 110 can be considered part of the molding system 100. Alternatively, the controller 152 can be remote from the molding system 100 and can communicate through a wired or wireless communication network with other components of the molding system such as the database 154 and sensor 150.

The database 154 is a physical memory for storing data such as measurements from the sensor 150 and instructions for the controller 152.

The shooting pot controller 110 can also include a user interface 156. The user interface 156 can be connected to or be a part of the controller 152. The user interface 156 can be a display and can also have an input device. The input device can consist of a touch screen display, a keyboard, or buttons with specific associated functions, for example. The user interface 156 can have an output device, such as the display, speakers or lights that are illuminated in response to certain conditions (as dictated by the controller, for example).

The shooting pot controller 110 can also include a timer 158 associated with the controller 152. The timer 158 can be used to time an injection cycle. By way of further example, the timer 158 can also be used to time specific operations in an injection cycle, such as the hold phase.

Figure 2:
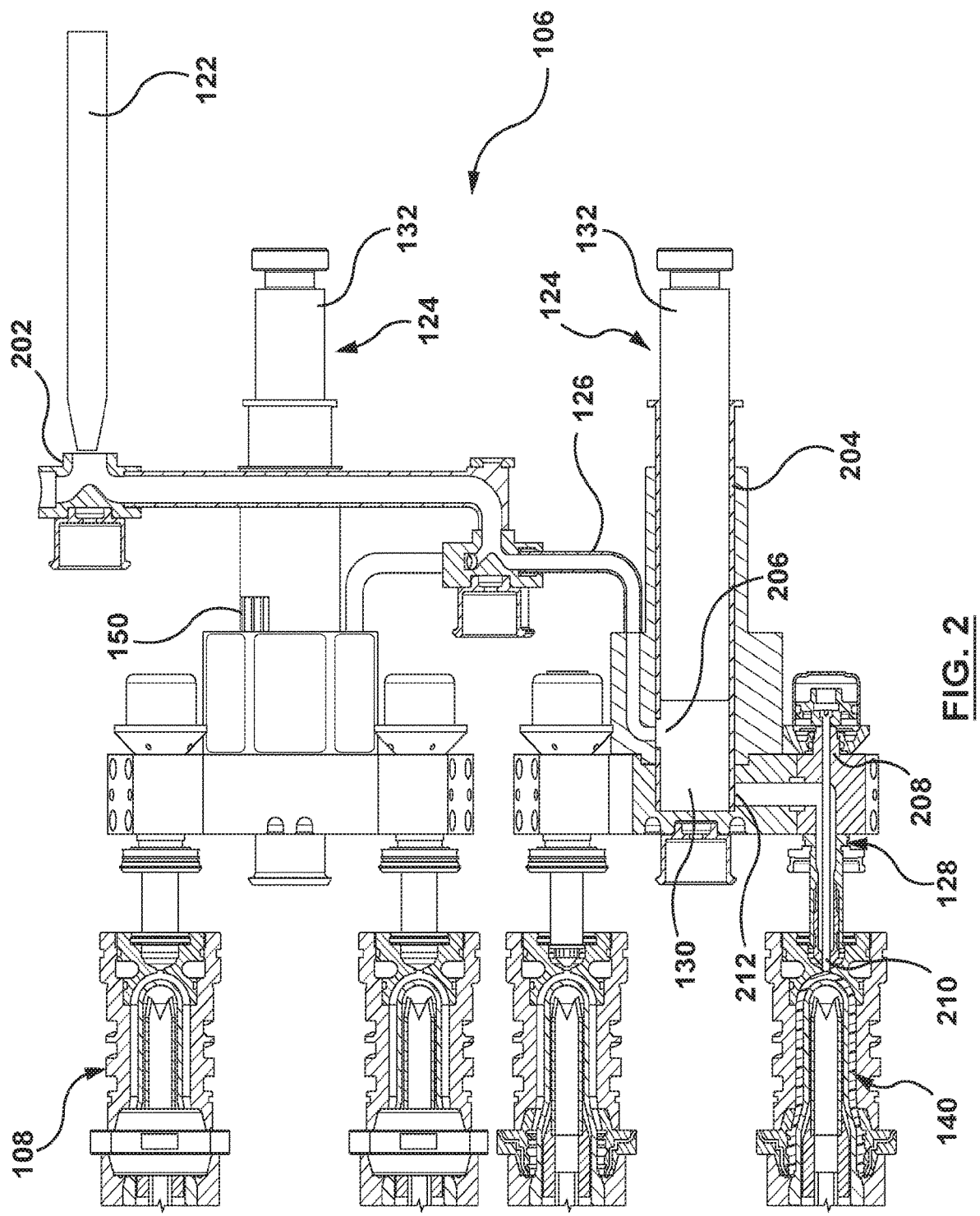
FIG. 2 is a side view of a portion of the molding system of FIG. 1.

FIG. 2 shows portions of the molding system 100 in more detail including the machine nozzle 122, a shooting pot 124, another shooting pot 124 shown cut away, a portion of the refill melt passage 198, an injection melt passage 199, the nozzle assembly 128, and mold cavities 140.

In the depicted embodiments, the machine nozzle 122 connects to a splitter 202 at an inlet of the refill melt passage 198. The splitter 202 diverts the resin into two (or more) distinct portions of the refill melt passage 198. Each distinct portion of the refill melt passage 198 leads, eventually, to one or more shooting pot 124. A portion of the refill melt passage 198 is shown cut away. The refill melt passage 198 leads from the splitter 202 to a secondary splitter 202. The secondary splitter 202 again splits the refill melt passage 198 so that it leads to one or more shooting pot 124. A portion of the refill melt passage 198 leads from the secondary splitter 202 through a shooting pot inlet 206 to the shooting pot cavity 130. The shooting pot cavity 130 is defined within a shooting pot housing 204. The shooting pot inlet 206 is a fluid connection in between the shooting pot cavity 130 and the refill melt passage 198 for allowing resin to flow through. For example, the shooting pot inlet 206 can be a hole in the shooting pot housing 204 that is connected to the refill melt passage 198. The portion of the refill melt passage 198 that leads from the machine nozzle 122 to the shooting pot 124 (i.e. to the shooting pot cavity 130) can be called the "refill circuit." In implementations in which the sensor 150 is a pressure sensor, the sensor 150 can be disposed within or proximate to the refill circuit.

The shooting pot housing 204 has a shooting pot outlet 212 that leads to an injection melt passage 199 which in turn fluidly connects to or passes through a nozzle assembly 128. For example, the nozzle assembly 128 can define a portion of the injection melt passage 199. The shooting pot outlet 212 can be a hole in the shooting pot housing 204, for example. In the embodiment shown in FIG. 2, the nozzle assembly 128 includes a valve gated nozzle assembly 128, a valve stem 208 and a nozzle outlet 210. The nozzle outlet 210 leads to (or fluidly connects to) a gate defined by the mold assembly 108. The gate is an opening into the mold cavity 140. The valve stem 208 is arranged and sized to reciprocate so as to open and shut the nozzle outlet 210, thereby allowing and blocking the resin, respectively, to flow out of the nozzle outlet 210.

The shooting pot housing 204 houses a shooting pot plunger 132. The shooting pot plunger 132 is arranged to reciprocate within the shooting pot housing 204. An actuator (not shown) is used to reciprocate the shooting pot plunger 132. The shooting pot plunger 132 is of such a size that when it moves towards the shooting pot outlet 212 it forces or expels the resin out of the shooting pot cavity 130 through the shooting pot outlet 212.

Separate or dedicated actuators can be used to reciprocate respective shooting pot plungers 132. In implementations when there are more than one shooting pots 124, one or more of the shooting pot plungers 132 can independently actuate.

FIGS. 3A, 3B, 3C and 3D show the shooting pot 124 in isolation with the shooting pot plunger 132 in four different positions. The shooting pot 124 in FIGS. 3A, 3B, 3C, and 3D has a shooting pot housing 204 having a plunger end 302 and an outlet end 304. The shooting pot outlet 212 is defined at the outlet end 304 of the shooting pot housing 204. The shooting pot outlet 212 extends to or fluidly connects to an outlet passage 306 that is on the same linear axis as the reciprocal movement of the shooting pot plunger 132. In other embodiments, such as shown in FIG. 2, the shooting pot outlet 212 is defined on a side wall of the shooting pot housing 204 so that it does not lead directly to an outlet passage that is on the same linear axis as the reciprocal movement of the shooting pot plunger 132. In the embodiment shown in FIG. 3A, the outlet passage 306 leads to another passage that leads to the nozzle assembly 128 (not shown in FIGS. 3A, 3B, 3C, 4D). For example, the outlet passage 306 can lead to the injection melt passage 199 that passes through or is partially defined within the nozzle assembly 128.

Figure 3:
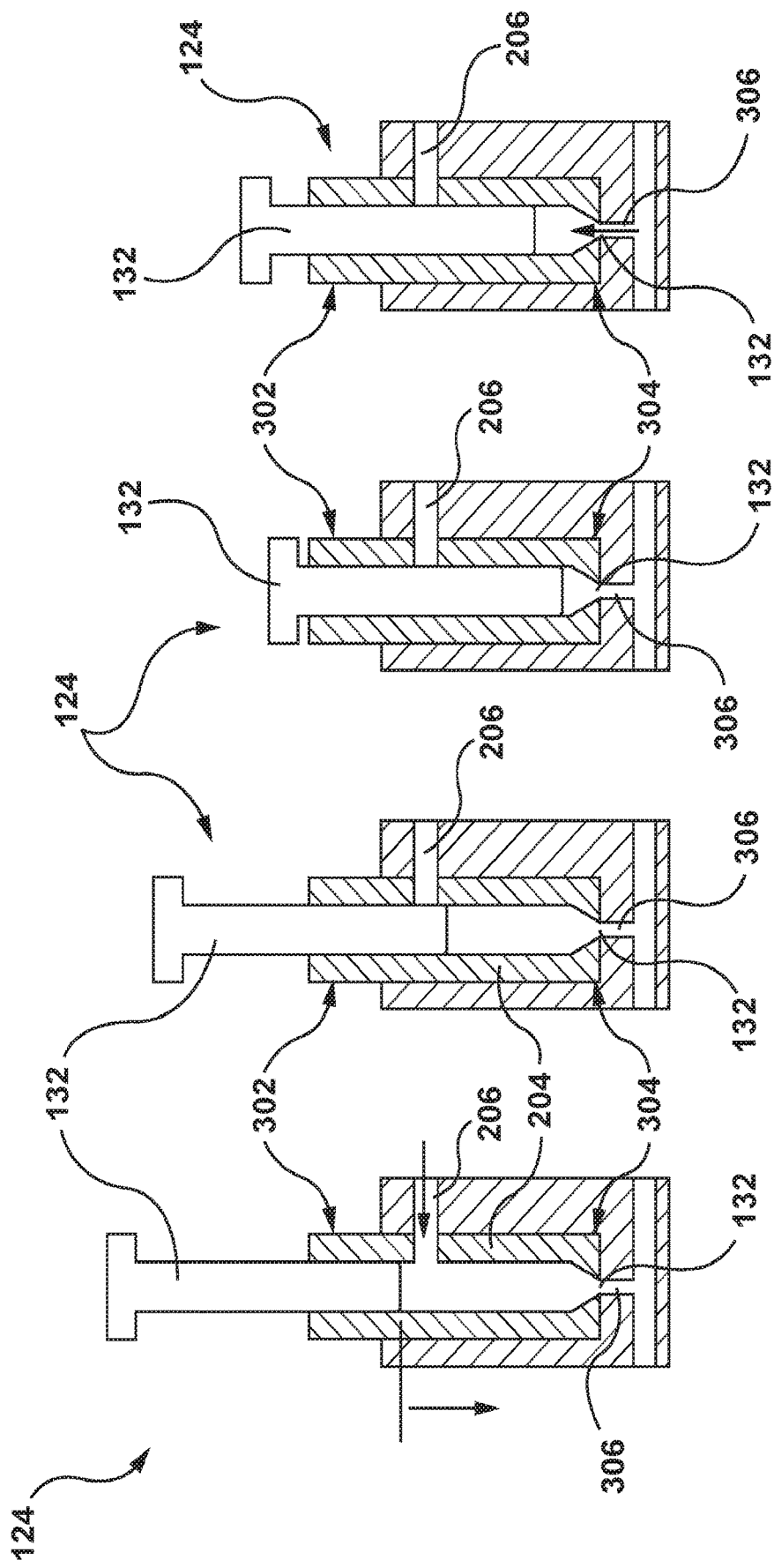
FIGS. 3A, 3B, 3C and 3D are side views of a showing pot in various stages of operation.

In FIG. 3A the shooting pot plunger 132 is retracted from the shooting pot housing 204. The retraction shown in FIG. 3A may be the maximum amount of retraction, although in other embodiments, the maximum retraction of the shooting pot plunger 132 can be more or less than is shown. When the shooting pot plunger 132 is in the retracted position (FIG. 3A), the shooting pot plunger 132 is not blocking the shooting pot inlet 206. This retracted position may also be identified as the "refill" position.

In FIG. 3B the shooting pot plunger 132 is partially retracted from the shooting pot housing 204. In this partial retraction position, the shooting pot plunger 132 is blocking the shooting pot inlet 206. In other words, resin cannot pass into the shooting pot cavity 130 because the shooting pot plunger is blocking the way. This partially retracted position may also be identified as the "ready" position.

In FIG. 3C the shooting pot plunger 132 is extended into the shooting pot housing 204. The shooting pot plunger 132 is blocking the shooting pot inlet 206 and is proximate to the shooting pot outlet 212. This extended position may also be identified as the "hold" position. In operation the shooting pot plunger 132 moves from a retracted position (e.g. the refill or ready position) to an extended position (e.g. the hold position). When the shooting pot plunger 132 is in the ready position and there is resin in the shooting pot cavity 130, the resin will be expelled out of the shooting pot outlet 212 when the shooting pot plunger 132 moves to the hold position.

The FIG. 3D, the shooting pot plunger 132 is retracted slightly from the shooting pot outlet 212. A slight retraction of the shooting pot plunger from the shooting pot outlet 212 can lower or relieve the pressure on the resin that is in the injection circuit. The injection circuit can consist of the injection melt passage 199. In some embodiments, the injection circuit can also include the shooting pot cavity 130. In some embodiments the injection circuit can include the injection melt passage 199 and one or more mold cavities that are connected to the injection melt passage 199. The shooting pot plunger 132 is thus in a partially retracted position in FIG. 3D. This partially retracted position can also be called the "decompression" position.

A shooting pot actuator (not shown) moves the shooting pot plunger 132 into each of the positions of FIGS. 3A, 3B, 3C and 3D. For example, the shooting pot actuator can move the shooting pot plunger 132 from the refill position to the ready position to the hold position and then to the decompression position with a predetermined motion profile.

In operation, when the shooting pot plunger 132 is in the refill position, resin enters through the shooting pot inlet 206 and into the shooting pot cavity 130 so as to fill the shooting pot cavity. While the resin is refilling the shooting pot cavity 130 the pressure on the resin in the shooting pot cavity 130 can be increasing (and thus the resin may compress). The shooting pot plunger 132 then moves to the ready position, causing further compression on the resin inside the shooting pot cavity 130 and blocking the shooting pot inlet 206. The shooting pot plunger 132 then extends to the hold position and while doing so expels the resin out of the shooting pot cavity 130 and through the shooting pot outlet 212. The shooting pot plunger 132 can stay in the hold position while the mold assembly 108 is in the closed position. Then the shooting pot plunger 132 can retract to decompress the resin in the shooting pot cavity 130. The shooting pot plunger 132 can continue to retract to the ready position (blocking the shooting pot inlet 206) or, if the shooting pot cavity 130 is to be refilled, to the refill position.

In alternative configurations of the molding system 100, the shooting pot inlet 206 can be controlled by a valve that is separate and independent from the shooting pot plunger 132.

Operation

Figure 4:
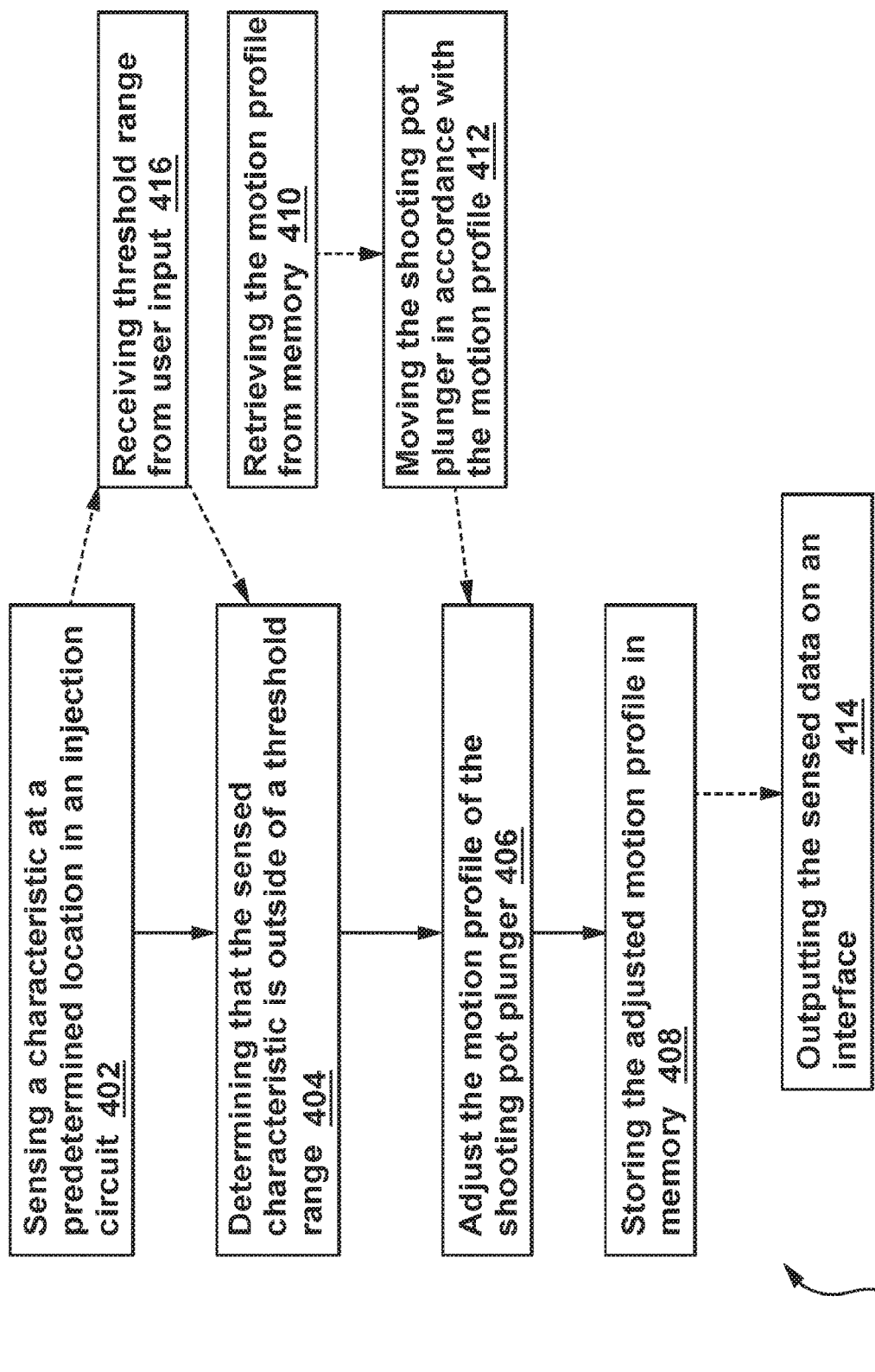
FIG. 4 is a flowchart depicting an exemplary method of adjusting a motion profile of a shooting pot plunger.

FIG. 4 is a flowchart depicting a method of adjusting a motion profile of a shooting pot plunger 132 for use in a molding system 100. The shooting pot plunger 132 is slidably movable within the shooting pot cavity 130. For example, the shooting pot plunger 132 can slide within the shooting pot cavity 130 to expel melted resin from the shooting pot cavity 130. The actuator of the shooting pot plunger 132, which causes the shooting pot plunger 132 to move within the shooting pot cavity 130, can be controlled by a controller 152 that is remote from the shooting pot cavity 130.

At 402, a characteristic is sensed at a predetermined location in an injection circuit of the molding system 100. For example, the injection circuit can be the injection melt passage 199 that fluidly connects the shooting pot cavity 130 to a mold cavity. By way of further example, the injection circuit can be the injection melt passages 199 that fluidly connect one or more shooting pot cavities 130 to a plurality of mold cavities. In some embodiments, the injection circuit can also include the shooting pot cavity 130. In some embodiments the injection circuit can include the injection melt passage 199 and the mold cavity (or mold cavities) that are connected to the injection melt passage 199.

The measured characteristic can be pressure or temperature, for example.

Pressure can be sensed using a pressure sensor 150 disposed at or proximate to the predetermined location in the injection circuit. The sensor 150 (e.g. pressure sensor) can be in communication with a controller 152 so that the sensed data (e.g. sensed pressure) can be transmitted or communicated to the controller 152. Such sensing or communicating can be periodic or can occur at predetermined times.

The injection circuit can include a mold cavity, for example. In such embodiments, the sensor 150 can be a thermocouple disposed in the mold cavity portion of the injection circuit.

At 404, it is determined that the sensed characteristic is outside of a threshold range. For example, the sensed pressure value can be compared to a range of threshold pressures or the sensed temperature value can be compared to a range of threshold temperature values.

Figure 5B:
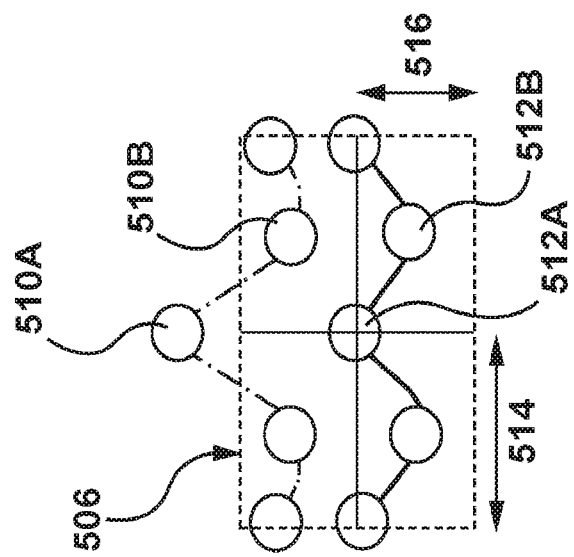
FIGS. 5A and 5B are graphs showing the monitoring window and data acquisition rate.
Figure 5A:
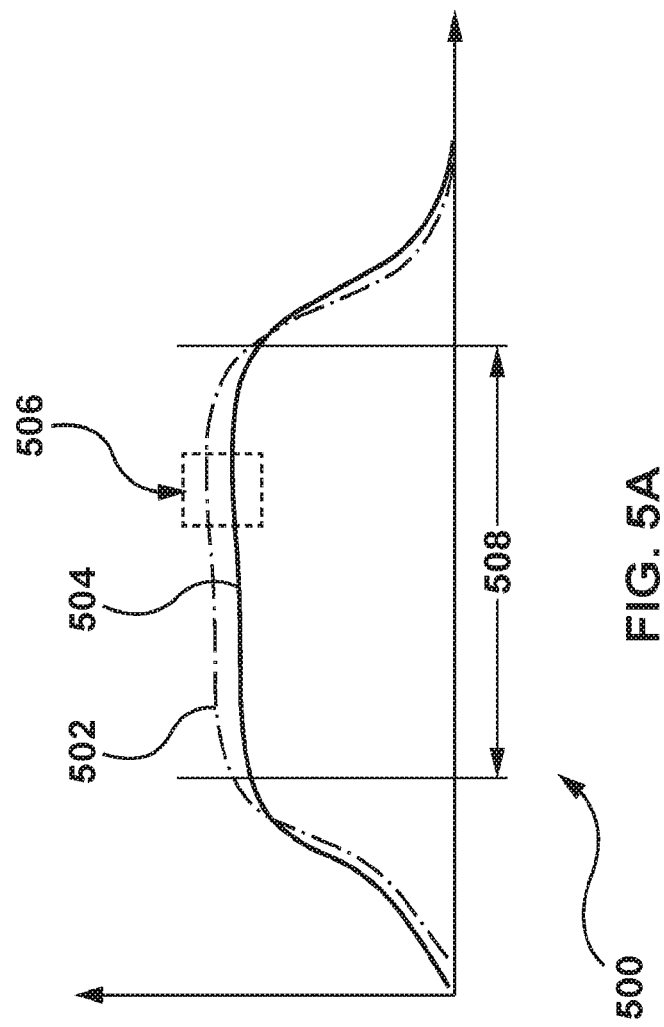

FIG. 5A shows a graphical representation 500 of the sensed pressure and the threshold pressure range. FIG. 5B shows a detailed view of the graphical representation 500 of FIG. 5A. The graphical representations shown in FIGS. 5A and 5B can be representations that are displayed on the user interface 156 of the controller 152 during the operation of the molding system 100.

Similar graphical representations 500 to FIGS. 5A and 5B would be used when the sensed characteristic is temperature.

The y-axis of the graphical representation 500 is the value of the pressure of the resin at the predetermined location of the molding system 100. The x-axis of the graphical representation 500 is the time during an injection cycle. The time can be in milliseconds, for example. The origin is the start time of the injection cycle or the injection trigger.

In other embodiments, the graphical representation 500 shows data obtained from more than one pressure sensor 150 at more than one respective predetermined location in the molding system 100. For example, the graphical representation 500 can show an average of the sensed pressure values received from multiple sensors 150 in the molding system 500.

Different graphical representations 500 can be selected for display on the user interface 156 of the controller 152. For example, graphical representations 500 showing sensed pressure values for specific sensors 150 can be selected for display on the user interface 156 or on another display associated with the controller 152.

The data displayed on the graphical representation 500 includes threshold data 504 and sensed pressure data 502. In the embodiments, shown on a screen the threshold data 504 is a target or reference value. In some embodiments, the threshold data 504 is a range of pressure values. The threshold data 504 represents at least a part of the threshold pressure range. The sensed pressure data 502 represents the sensed pressure plotted on the graphical representation 500.

The monitoring time period 508 is the time period or window during which the controller compares the threshold data 504 to the sensed pressure data 502.

As is shown in detail in FIG. 5B, the sensed pressure data 502 includes a plurality of sensed pressure data points 510A, 510B measured throughout the injection cycle which are connected together in a line graph. Similarly, the threshold data 504 in the depicted embodiment shows threshold data points 512A, 512B. The threshold data points 512A, 512B can be target or ideal data points or can be reference data points measured on a previous injection cycle.

A determination of whether the sensed pressure is outside of the threshold pressure range can include determining whether one or more sensed pressure data points 510A, 510B are within an acceptable range or whether they deviate an acceptable amount from the corresponding threshold data points 512A, 512B (the correspondence is with respect to time). The shooting pot controller 110 can be programmed to base this determination on a predetermined number of sensed pressure data points 510A, 510B within a specific time period during the injection cycle, for example. The acceptable range or the acceptable amount of deviation can be predetermined or programmed into the shooting pot controller 110. The determination is similar when the sensed characteristic is temperature.

By way of example, a time tolerance 514 can be the length of time within which a sensed pressure data point would have to be within the acceptable amount from the threshold data point in order to determine that the sensed pressure is not outside of the threshold range. In the embodiment depicted in FIG. 5B, the time tolerance accounts for two preceding and one following data point. By way of further example, a measured value threshold 516 can be the acceptable amount of difference that the sensed pressure data point can be from the threshold data point. For example, the measure value threshold 516 can represent the threshold range for a given sensed pressure data point 510A, 510B.

In one or more embodiment the threshold range is predetermined based on a history of the molding system 100. For example, the threshold range can be representative of the sensed pressure from one or more previous injection cycles. By way of further example, the threshold range can be representative of the sensed temperature of one or more previous injection cycles.

The threshold range can be a reference cycle. The reference cycle can be the sensed measurements from a target, ideal or previous injection cycle, for example. The reference cycle can be selected through a user interface 156. For example, a number of potential reference cycles can be displayed on the user interface and one of the displayed reference cycles can be selected.

The reference cycle can be a series of data points representative of a reference pressure or reference temperatures as a function of time. For example, the reference cycle can consist of threshold data points 512A, 512B. Determining that the sensed pressure is outside of the threshold pressure range comprises comparing one or more of the series of threshold data points 512A, 512B with the corresponding sensed pressure data points 510A, 510B.

The reference cycle can be a tolerance band representative of a range of pressures as a function of time. For example, the tolerance band can be a predetermined tolerance around the threshold data points 512A, 512B. Determining that the sensed pressure is outside of the threshold pressure range can include determining that a predetermined number of sensed pressure data points are outside of the tolerance band for a predetermined window of time. The predetermined window of time can be the time tolerance 514.

Optionally, at 416 a threshold range can be received from a user input. For example, the user input can be data entered into an interface with the data identifying the pressure ranges.

At 406 the motion profile of the shooting pot plunger 132 is adjusted to account for determining that the sensed pressure is outside of the threshold pressure range.

The motion profile is a profile of the position or speed of the shooting pot plunger 132. For example, the motion profile can indicate a position or speed of the shooting pot plunger at a given time during an injection cycle. The motion profile can be stored in a memory associated with the controller. The motion profile can be used by the controller 152 to control the position and movement the shooting pot plunger 132.

In some embodiments, the motion profile can be automatically adjusted. For example, the controller 152 can automatically adjust the motion profile by taking the sensed pressure, the threshold pressure range (and potentially the time during the injection cycle) as input and can output an adjusted motion profile. The controller 152 can access a mapping or a predetermined function that takes these inputs and calculates the adjusted motion profile. The mapping can be stored in the database 154 associated with the controller 152.

Optionally, at 412, before adjusting the motion profile, the shooting pot plunger 132 is moved in accordance with the motion profile. For example, the controller 152 can actuate the shooting pot plunger 132 while the pressure is sensed 402 at the predetermined location in the injection circuit.

Optionally, at 410, before moving the shooting pot plunger 132, a motion profile is retrieved from a memory (e.g. database 154). For example, the controller 152 can retrieve the motion profile from a database of motion profiles.

At 408 the adjusted motion profile is stored in a memory (e.g. database 154). After the adjusted motion profile is stored in the memory, the controller 152 can then use this adjusted motion profile for a future injection cycle.

Optionally, at 414, the sensed data is output on an interface. For example, the sensed data can be output on the display (e.g. user interface 156) in graphical format or in numerical format.

In an example operation, when the sensed pressure 402 at the predetermined location in the injection circuit is less than the threshold pressure range 404 and the motion profile is adjusted 406 by increasing a stroke of the shooting pot plunger 132. When the sensed pressure is less than the threshold pressure range, it may be an indication that the part filling pressure is going down or the parts are shot.

In another example operation, when the sensed pressure 402 at the predetermined location in the injection circuit is more than the threshold pressure range 404 and the motion profile is adjusted 406 by reducing a stroke of the shooting pot plunger 132. When the sensed pressure is less than the threshold pressure range, it may be an indication that the part filling pressure is increasing or the parts are flashing.

In one or more embodiments, sensing the pressure at the predetermined location includes sensing the pressure at the predetermined location at two or more predetermined instances during an injection cycle. In the same embodiments, determining that the sensed pressure is outside of the threshold pressure range can include determining that the sensed pressure is outside of the threshold pressure range in respect of at least one of the predetermined instances. In such embodiments, adjusting the motion profile of the shooting pot plunger 132 can include adjusting a portion of the motion profile that corresponds to the predetermined instance for which the sensed pressure is outside of the threshold pressure range.

Other non-limiting embodiments, modifications and equivalents will be evident to one of ordinary skill in the art in view of the present disclosure.

This disclosure has presented one or more non-limiting exemplary embodiments. It will be clear to those skilled in the art that modifications and variations can be made to the disclosed non-limiting embodiments without departing from the intended scope of this disclosure. The described non-limiting embodiments ought to be considered to be merely illustrative of some of the features or elements of this disclosure as a whole. Other beneficial results can be realized by applying the non-limiting embodiments in a different manner or modifying them in ways known to those familiar with the art. Certain features or sub-features of one embodiment may be combined with certain features or sub-features of another embodiment to arrive at a combination of features not specifically described above but still within the intended scope of the disclosure. Any such suitable and workable combination of features would be known to persons skilled in the relevant art after reviewing the present disclosure.

What is claimed is:

1. A shooting pot controller system (110) for adjusting a motion profile of each of a plurality of shooting pot plungers for use in a molding system, each shooting pot plunger slidably movable within a respective shooting pot cavity, the shooting pot cavity having an inlet for receiving melted resin and an outlet for expelling melted resin, the shooting pot cavity for receiving melted resin from an injection unit comprising:

a controller (152) for controlling the operation of the shooting pot plunger in the shooting pot cavity in accordance with the motion profile during an injection cycle to expel melted resin and during a refill cycle to receive melted resin from the injection unit, the motion profile defining (i) a retracted position in which the shooting pot plunger permits melted resin to pass into the shooting pot cavity, (ii) a ready position in which the shooting pot plunger is partially retracted from the outlet and is blocking melted resin from passing through the inlet into the shooting pot cavity, and (iii) a hold position in which the shooting pot plunger is extended into the shoot pot cavity and blocking melted resin from passing through the inlet into the shooting pot cavity;

a sensor (150) for sensing a characteristic at a predetermined location in an injection circuit for the respective shooting pot of the molding system, the sensor in communication with the shooting pot controller; and a database (154) in communication with the shooting pot controller, the database for storing a mapping between sensed characteristics and motion profile adjustments.

2. The shooting pot controller system of claim 1, wherein the database maintains the motion profile for the shooting pot plunger (132).

3. The shooting pot controller system of claim 1, further comprising an interface (156) for outputting the sensed data.

4. The shooting pot controller system of claim 1, wherein each of the plurality of shooting pot plungers is independently actuated.

\* \* \* \* \*